UNITED STATES PATENT OFFICE.

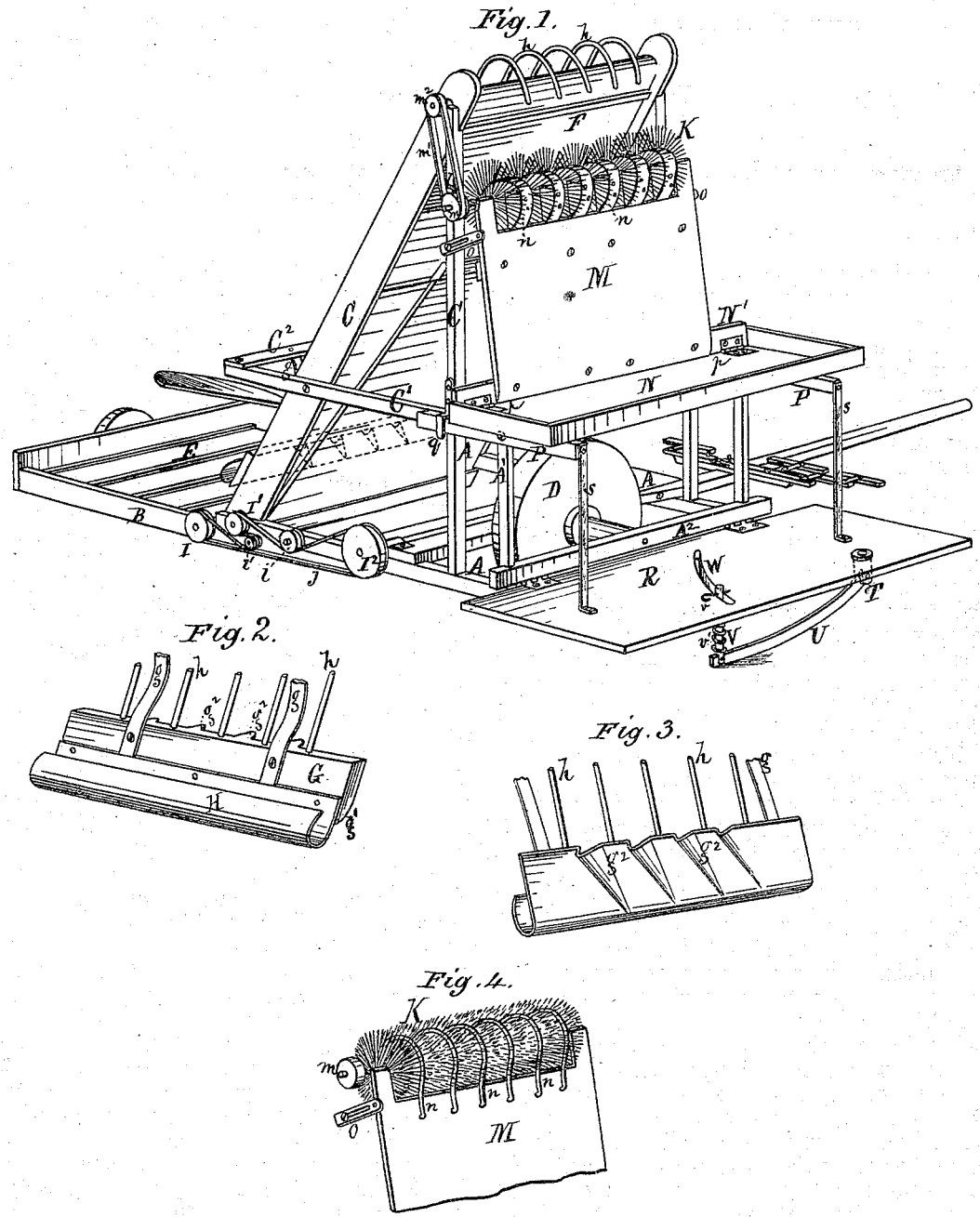

CHRISTOPHER W. LEVALLEY, OF ST. PAUL, MINNESOTA.

IMPROVEMENT IN HARVESTERS.

Specification forming part of Letters Patent No. 157,477, dated December 8, 1874; application filed September 4, 1874.

*To all whom it may concern:*

Be it known that I, CHRISTOPHER W. LE-VALLEY, of St. Paul, county of Ramsey, State of Minnesota, have invented certain new and useful Improvements in Harvesting-Machines, of which the following is a full, clear, and exact description, reference being had to the accompanying drawing, making a part of this specification, in which—

Figure 1 is a perspective view of a harvesting-machine embracing my improvements. Fig. 2 is a perspective view of the yielding bar to which the retaining-wires of the elevator are attached, showing the connection therewith of the retarding or straightening ribs, and also of the deflecting shield or guard. Fig. 3 is a rear perspective view of the same device, showing a modification in the construction; and Fig. 4 is a perspective view of the stripper-brush.

Similar letters of reference denote corresponding parts wherever used.

The invention consists, first, in the combination, with the shield or bar which supports the retaining rods or wires of the elevator, of a series of retarding-strips, by means of which the straw or grain, as it is delivered to the elevator, is straightened and brought into the proper shape or condition to be acted upon by the binders; second, in the combination of a stripper-brush with the elevator-aprons, for removing the grain therefrom at the desired point of discharge; third, in combining a yielding runner or shoe with the hinged and folding binders' platform, whereby the weight of the binders is, in part, removed from the suspending-links, and whereby also the platform is enabled to readily surmount obstacles which might otherwise obstruct the progress of the machine without disturbing the relation of the receiver and binders' table to the elevator-apron.

In the accompanying drawing, A represents the main frame; B, the platform-frame; C, the triangular elevator-frame; D, the main ground and driving wheel; E, the platform or receiving-apron; and F, the elevator-apron, these parts being constructed and arranged in any usual or preferred manner. The elevator-frame C has connected with it, in front and rear, two transverse bars, $C^1$, which at their inner ends overhang or project beyond the elevator-apron, and support the seat-plank $C^2$, from which is suspended, by means of yielding strap-springs $g$, the longitudinal bar G, to which the retaining rods or wires $h$, which overhang the elevator-apron F and hold the grain down thereon, are secured. This bar G may be made of a piece of plank, as shown in Fig. 2, curved on its lower edge or corner into runner form, as shown at $g^1$, and provided at its lower edge with a shield or deflector, H, and on its lower face with wedge-shaped retarding strips or cleats $g^2$; or it may be struck up from sheet metal, as shown in Fig. 3, with the deflecting-shield H and retarding-wedges $g^2$ formed in one piece therewith. The shield H in form approaches an ellipse, its upper face inclining toward the apron E in such a manner as to cause any grain thrown upon it by the action of the reel to slide quickly down upon said apron, and the curve given to its exposed face prevents the straw thrown against it from being broken, and thus made to hang and form an obstruction to the discharge of the grain by the apron E. The strips $g^2$ are made in wedge form, tapering to a point or thin edge at their lower ends, so as not to interfere with the ready admission of the grain to the elevator-apron and underneath the bar G, and thence, increasing in thickness, they are made by their pressure, and consequent friction upon the straw, to retard the movement of the grain until the straw is straightened against and carried forward by the positive movement of the strips or cleats on the elevator-apron.

It is a fact, well understood by those familiar with the operations of these machines, that the barbed heads of the grain cling closely to the apron, and are carried steadily forward thereby, while the smooth butts overhanging the forward platform or finger-bar are liable to be retarded thereby, and by the incoming grain, in such manner as to cause the straw to come obliquely to the elevator-apron, with the heads in advance. To meet this difficulty the cleats or wedges $g^2$ are made largest or thickest at the rear, gradually diminishing toward the front end of the bar G, where there is little or no necessity for retarding the straw, this arrangement of the retarding-strips tending also to draw the straw slightly toward the rear and away from the stationary forward frame-bars, which obstruct the forward movement of the butts of the grain.

The arrangement of pulleys and driving-belt for actuating the platform and elevator-apron is as follows: The rear end of the shaft of the inner roller of the platform-apron has a pulley, I, keyed to it, and the rear end of the elevator-roller is provided with a similar pulley, $I^1$. $I^2$ is a driving-pulley mounted on the rear end of a longitudinal shaft, which may be driven by bevel-gears, or in any convenient way, from the main drive-wheel or axle, and between the pulleys $I^1$ $I^2$ is an idler, $i$, and between said idler $i$ and the pulley $I^1$, and below the plane of the latter, is a second idler, $i'$, arranged as shown in Fig. 1, in such a manner that the driving band or belt $j$, extending in a right line from the pulley I to the driving-pulley $I^2$ underneath, passes around and over said pulley I under the idler $i$, over, around, and under the pulley I back to and around the idler $i'$, and thence over and around the pulley I, the arrangement being such as to cause the belt to closely wrap the pulleys I $I^1$, and thus avoid the slipping of the belt and insuring the uniform movement of the platform and elevator aprons relatively to each other by the use of a single driving-belt.

Where a stripping-brush, such as is hereafter described, applied to the elevator-apron, is used in connection with the platform-apron, it may be operated from said belt $j$ in any convenient way.

The stripping-brush K is made of a length conforming to the width of the elevator-apron, and, as applied thereto, has its shaft mounted in adjustable bearing-plates $l$, said plates being slotted, and secured to the elevator-frame by set-screws, which permit the adjustment of the brush as required. The rear end of the stripper-brush shaft is armed with a pulley, $m$, and motion is imparted thereto by a band, $m^1$, extending over a similar pulley, $m^2$, on the rear end of the shaft of the upper elevator-roller. The brush K may be made in sections, with intermediate stripping-straps $n$, which extend over its shaft in close proximity thereto, and are connected, at their outer ends, with the hinged guard M; or it may be made continuous with simply stripping-wires passing through the bristles, wire, or other material, of which the brush may be formed.

Stripping devices have been employed for removing the straw or grain from the carrying-aprons, but the rigid materials of which these have heretofore been composed, when arranged in the necessary proximity to said aprons to effect the removal of the grain, have been found to obstruct the movement of the aprons by coming in contact with the cleats on said apron, and which cleats, or the equivalent therefor, are necessary in order to insure the positive movement of the grain, and its delivery in proper shape for binding. This difficulty is obviated by the employment of the brushes composed of a material which will yield to permit the passage of the apron slats or cleats.

The inclined shield M, upon which the grain descends to the receptacle N after being discharged by the elevator, is supported at its upper end by pivoted links $o$, connecting it with the elevator-frame, said links being made adjustable by slots and set-screws for varying the position of the upper end of the shield M, and of the straps $n$, to adapt it to the position of the brush K; or, if preferred, this shield may be pivoted directly to the shaft of the brush K. The lower end of the shield M has a longitudinal bar, N', rigidly secured to it, said bar forming the inner side of the grain-receptacle, which is made in the form of a shallow box, open on top, for adapting it to receive and retain the shattered grain. The bottom board of this box is connected, by hinges at $p$, with the bar N', in such manner as to permit it to be folded up into a vertical position against the shield M for transportation. The receptacle N, when the machine is in operation, rests upon transverse bars P, pivoted in the uprights $A^1$, the inner ends of said bars P being supported by stirrups $q$, which prevent their outer end from dropping below a horizontal position, but permit their being folded up for transportation. R is the binders' stand or platform, hinged at its inner edge to the main-frame bar $A^2$, and supported at or near its outer edge by straps $s$ $s$, which suspend it from the outer ends of the bars P P in such manner as to prevent it from dropping below a line parallel with the bars P, and with the main and platform frames, while at the same time it is left free to be folded upward for transportation. The stand or platform R, near its forward end, has a vertical shank, T, pivoted to it, the lower end of said shank or pin extending below the platform, where it is forked to receive the forward end of a runner, U, which, at its rear end, has a post or standard, V, connected with it, said standard extending up through a curved slot, W, in the platform. A pin, $v$, passing through one of a series of holes in the upper end of the standard, prevents the standard from dropping out of the slot, and a spiral spring, $v'$, surrounding the standard, and bearing against the platform at one end, and against the runner at the other, serves, by its tension, to hold the platform and runner apart as far as the position of the pin $v$ will permit, and the runner, when properly adjusted, sustains, in part, the weight of the binder standing on the platform, while at the same time the runner adapts the machine to pass lightly and easily over obstructions, which might otherwise impede its progress. The curved slot W permits the lateral movement of the rear end of the runner, and facilitates the turning of corners.

Parts of the machine not particularly described may be constructed in any usual or preferred manner.

Having thus described my invention, what I claim as new, and desire to secure by Letters Patent, is—

1. The yielding bar G, to which the retaining rods or wires $g$ are connected, in combination with the retarding wedges or cleats $g^2$, substantially as described.

2. The combination of the stripper-brush K with the endless elevator-apron, substantially as and for the purpose described.

3. The binders' stand, hinged to the main frame, in combination with the supporting-straps $s$ and yielding runner U, substantially as described.

4. The runner U, pivoted to the platform R, and provided with the rear standard working in the curved slot W in the platform, in combination with the spring $v^1$, arranged and operating as described.

CHRISTOPHER W. LEVALLEY.

Witnesses:
O. P. WICKES,
C. E. BENTON.